US010679328B2

(12) United States Patent
Nanda et al.

(10) Patent No.: US 10,679,328 B2
(45) Date of Patent: Jun. 9, 2020

(54) MACHINE LEARNING TECHNIQUES FOR INCREASING COLOR CONSISTENCY ACROSS VIDEOS

(71) Applicant: Adobe Inc., San Jose, CA (US)

(72) Inventors: Chetan Nanda, New Delhi (IN); Ramesh P. B., Uttar Pradesh (IN); Sweta Agrawal, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 62 days.

(21) Appl. No.: 15/987,551

(22) Filed: May 23, 2018

(65) Prior Publication Data

US 2019/0362478 A1   Nov. 28, 2019

(51) Int. Cl.
| | |
|---|---|
| *G06T 5/40* | (2006.01) |
| *G06T 5/50* | (2006.01) |
| *G06T 7/90* | (2017.01) |
| *G06T 7/44* | (2017.01) |

(52) U.S. Cl.
CPC ............... *G06T 5/40* (2013.01); *G06T 5/50* (2013.01); *G06T 7/44* (2017.01); *G06T 7/90* (2017.01); *G06T 2207/10016* (2013.01)

(58) Field of Classification Search
CPC .... H04N 21/4143; H04N 7/141; H04N 7/147; H04N 7/15; G06F 3/14
See application file for complete search history.

(56) References Cited

U.S. PATENT DOCUMENTS

2004/0057061 A1* 3/2004 Bochkarev ........... H04N 1/6011
358/1.9

OTHER PUBLICATIONS

Reinhard, Erik, et al. "Color Transfer Between Images", IEEE Computer Graphics and Applications, vol. 21, Issue 5, Sep. 2001, 8 pages.
Li, Feng, et al., "An Approach of Detecting Image Color Cast Based on Image Semantic", Machine Learning and Cybernetics, Proceedings of 2004 International Conference on. vol. 6, IEEE, 2004, 5 pages.
Wu, Fuzhang, et al. "Content-Based Colour Transfer", Computer Graphics Forum. vol. 32, No. 1, Blackwell Publishing Ltd, Jan. 2013, 12 pages.

(Continued)

*Primary Examiner* — Ruiping Li
(74) *Attorney, Agent, or Firm* — Kilpatrick Townsend & Stockton LLP

(57) ABSTRACT

Disclosed systems and methods use machine-learning techniques to determine a set of parameters that if applied to a target video, apply a color characteristic of a reference video to the target video. For example, a color consistency application executing on a computing device computes a feature vector including a representation of a reference video and a target video. The application determines a set of color parameters (e.g., exposure, color temperature, tint, etc.) by applying the feature vector to one or more predictive models trained to determine color consistency. The application generates a preview image by applying the parameters to the target video. The applying causes an adjustment of exposure, color temperature, or tint in the target video such that a color consistency of the adjusted target video is consistent with a color consistency of the reference video. The color consistency application provides settings to further adjust the parameters.

20 Claims, 5 Drawing Sheets
(3 of 5 Drawing Sheet(s) Filed in Color)

(56) References Cited

OTHER PUBLICATIONS

Bonneel, Nicolas, et al, "Example-Based Video Color Grading", ACM Transactions Graphics, vol. 32, Issue 4, Jul. 2013, 11 pages.
Xiao, Xuezhong, et al., "Temporal Color Morphing", Entertainment Computing—ICEC 2007, 11 pages.

* cited by examiner

MACHINE LEARNING TECHNIQUES FOR INCREASING COLOR CONSISTENCY ACROSS VIDEOS

TECHNICAL FIELD

This disclosure relates generally to color correction. More specifically, but not by way of limitation, this disclosure relates to using machine learning techniques to automatically apply color characteristics of a first video to a second video.

BACKGROUND

Videos captured from different cameras, at different times of day, or with varied light conditions can have a varying color consistency, or color cast. Varying color cast can cause a movie that is created from different videos to have an inconsistent look and feel. Consequently, significant work is required to manually edit individual videos to ensure the color cast of a movie remains consistent throughout. Typically, an editor is required to manually adjust parameters such as brightness, exposure, and color, for each video that is assembled into a movie. But such work is time consuming and tedious.

Existing solutions for automatically adjusting color across videos only examine global features and therefore provide suboptimal results by, for example, ignoring local variations such as features that are specific to different tonal ranges. For instance, different regions of video frames can be illuminated differently from other regions. Existing solutions fail to detect such variations and consequently fail to accurately propagate color consistency between videos. Other solutions use algorithms that cannot account for unusual color mismatches between videos and therefore give sub-optimum results.

Accordingly, solutions are needed for automatically suggesting changes to improve color consistency across videos.

SUMMARY

Embodiments described herein use machine-learning techniques to determine a set of parameters that if applied to a target video, apply a color characteristic of a reference video to the target video. For example, a color consistency application executing on a computing device computes a feature vector including a representation of a reference video and a target video. Each video includes a lightness channel and a color channel. The feature vector includes: a first histogram of a lightness channel and a second histogram of a color channel of a representative image of the respective video, and statistical attribute data and a mask for each of the lightness and color channels of a tonal segment of the representative image of the respective video. The color consistency application determines a set of color parameters by applying the feature vector to one or more predictive models trained to determine color consistency. The color consistency application generates a preview image by applying the parameters to the target video. The applying causes an adjustment of color parameters in the target video such that a color consistency of the adjusted target video is consistent with a color consistency of the reference video. The color consistency application displays an interface including the preview image and user interface elements that indicate the color parameters, and provide adjustable settings to further adjust the parameters.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

The patent or application file contains at least one drawing executed in color. Copies of this patent or patent application publication with color drawings will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
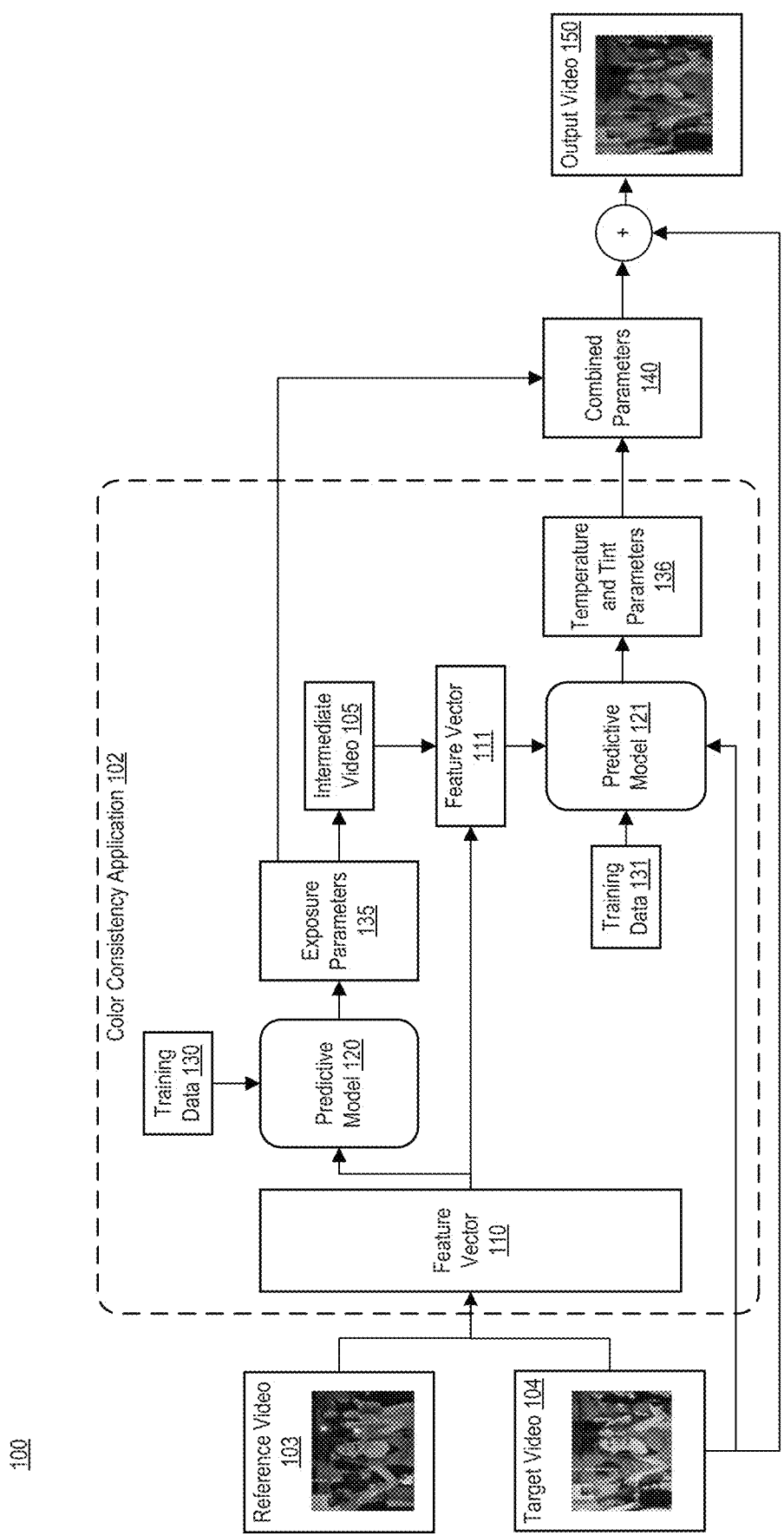
FIG. 1 depicts a color consistency system, according to certain embodiments of the present disclosure.

Systems and methods are disclosed herein for using machine learning techniques to automatically apply color characteristics of a reference video to a target video. Embodiments determine a set of color parameters that, if applied to the target video, transform the color characteristics of the target video to be consistent with the color characteristics of the reference video. Color parameters can include, but are not limited to, exposure, color temperature, and tint. Consistency, in this context, means that the visual appearance of the color characteristics in the target video are similar to the visual appearance of the color characteristics in the reference video. For example, if the reference video was filmed in the evening but the target video was filmed in the morning, then the color characteristics of the reference video can be transferred to the target video. In so doing, a movie resulting from the two videos has a consistent color cast such that the target video appears to have been filmed under the same evening lighting conditions as the reference video. In another example, a similar process can be used to ensure that movies from the same director have color consistency. For instance, if a first movie (i.e., the reference video) is filmed such that each scene includes a blue-hued color scheme, the color consistency application can modify a second movie (i.e., the target video) to apply the same blue-hued color scheme to the second movie.

Embodiments described herein determine a set of color parameters that, if applied to a target video, propagate a reference video's color consistency to a target video. Propagating a reference color consistency to the target video causes the target video reflects a similar look and feel as the reference video. The color parameters' can be visualized as sliders on a user interface which, by default, are initially applied to a preview image extracted from the target video, rather than the target video itself. In this manner, the slider values can be further customized and the expected results previewed before the color parameters are applied to the target video. In contrast, existing solutions automatically apply color parameters to the target video, rendering further manual customization of the parameters difficult.

In an example, a color consistency application operates within an existing video workflow such as within a video-editing application. The color consistency application receives an identification of a reference video and a target video. The color consistency application computes a feature vector for the reference video and the target video. Each feature vector includes global features. Global features include a histogram of a luminance channel and two color channels. Local features include a mean, a standard deviation, a histogram and mask fraction of one or more tonal segments derived from a luminance channel of the video such as midtones, shadows, or highlights. A mask fraction represents a set of pixels included in a particular tonal segment. By using such a feature vector in conjunction with machine learning techniques, the color consistency application facilitates a more accurate matching of color cast between videos than possible with previous solutions, which are limited to less advanced representations and the use of heuristic algorithms. For example, by representing both global features such as lightness along with local features such as variations in luminance and color within midtones, shadows, and highlights, the color consistency application accurately represents the exposure and color of the target and reference videos in the respective feature vectors. Additionally, existing techniques do not permit additional customization of color parameters, as the color parameters are automatically applied to the target video.

Continuing the example, the color consistency application provides the feature vector, representing the target video and the reference video, to a first predictive model, such as a machine learning model. The color consistency application applies the predictive model to the feature vector, thereby predicting exposure parameters. The color consistency application applies the exposure parameters to the target video, thereby generating an intermediate video, and generates an additional feature vector from the intermediate video and the features of the feature vector that are relevant to the reference video. The color consistency application provides the additional feature vector a second predictive model. The second predictive model predicts color temperature and tint parameters.

Together, the exposure parameters and the color and tint parameters form a set of parameters that, when applied to the target video, will result in a color scheme that is consistent with the reference video. By using machine learning techniques and a feature vector that represents global and local variations in color characteristics, the color consistency application determines parameter values that, when adjustments are made to the target video that correspond to the color parameters, the target video is updated with a color consistency that more closely represents the reference video.

Continuing the example, the color consistency application provides the parameters to a user via a graphical user interface, along with a preview image that is a frame of the target video that has been modified using the parameter values. The color consistency application can then receive further modifications to the parameter values via the graphical user interface before applying the parameters to the target video. A video editing application executing on a computing device can preview the effect of applying the suggested parameters and facilitate making further manual edits if desired.

Embodiments provide improvements to the technical field of video processing. More specifically, the color consistency application accurately captures color characteristics of a reference video and a target video by representing, for both videos, global features such as lightness and local features such variations in luminance and color in different tonal regions. Videos represented using these embodiments more accurately model color characteristics of a reference video and a target video, and can thereby more accurately propagate the color consistency of a the reference video to the target video. Embodiments described herein provide advantages over previous solutions by using both global and local features of the videos such that a set of parameters that more accurately model color consistency can be derived and applied to a target video.

FIG. 1 depicts a color consistency system, according to certain embodiments of the present disclosure. FIG. 1 depicts color consistency environment 100. Color consistency environment 100 includes one or more of color consistency application 102, reference video 103, target video 104, combined parameters 140, and output video 150. Color consistency application 102 includes predictive model 120, training data 130, exposure parameters 135, intermediate video 105, feature vector 111, predictive model 121, training data 131, and temperature and tint parameters 136. Color consistency application 102 uses machine learning techniques to automatically apply color characteristics of reference video 103 to target video 104. Color consistency application 102 can execute on the computing system depicted in FIG. 5.

More specifically, color consistency application 102 uses predictive model 120 to predict exposure parameter 135, that if applied to target video 104, results in the exposure of target video 104 being similar to an exposure of reference video 103. Color consistency application 102 uses predictive model 121 to predict temperature and tint parameter 136, that if applied to target video 104, results in target video 104 having a similar color temperature and tint to reference video 103. Exposure parameters 135 and color temperature and tint parameters 136 are integrated into combined parameters 140.

Predictive model 120 is trained using training data 130 and predictive model 121 is trained using training data 131. Training data 130 and training data 131 can include a set of training vectors. In an example, each vector can include a feature vector representing an original video (or a representative frame of a video), a feature vector representing a version of the video that is modified by changing a color parameter of the original video, and the parameters that were used to modify the video.

In an example, color consistency application 102 represents a particular frame of reference video 103 and a particular frame of target video 104 by feature vector 110. Feature vector 110 includes color characteristics that represent a respective video such as global features such a histogram of a lightness and color channel and local features such as variations in luminance and color in different tonal segments. A tonal segment can be represented by a mask that represents the pixels that are present in the tonal range.

Continuing the example, color consistency application 102 determines a set of exposure parameters 135 by providing feature vector 110 to predictive model 120. Predictive model 120 can be a gradient boosted decision tree, XGBoost model, boost model, convolutional neural network, or other model. Color consistency application 102 applies exposure parameters 135 to a copy of the target video 104, thereby creating intermediate video 105. Color consistency application 102 determines feature vector 111 from intermediate video 105 and from the features of feature vector 110 relevant to reference video 103. In this manner, feature vector 111 includes the exposure changes.

Color consistency application 102 provides feature vector 111 to predictive model 121. Predictive model 121 outputs temperature and tint parameters 136. Color consistency application 102 combines exposure parameters 135 and color temperature and tint parameters 136 into combined parameters 140. If applied to target video 104, combined parameters 140 transform target video 104 to have the color characteristics of reference video 103. Color consistency application 102 can provide combined parameters 140 to a graphical user interface so that a user may adjust the parameters and preview the results.

Figure 2:
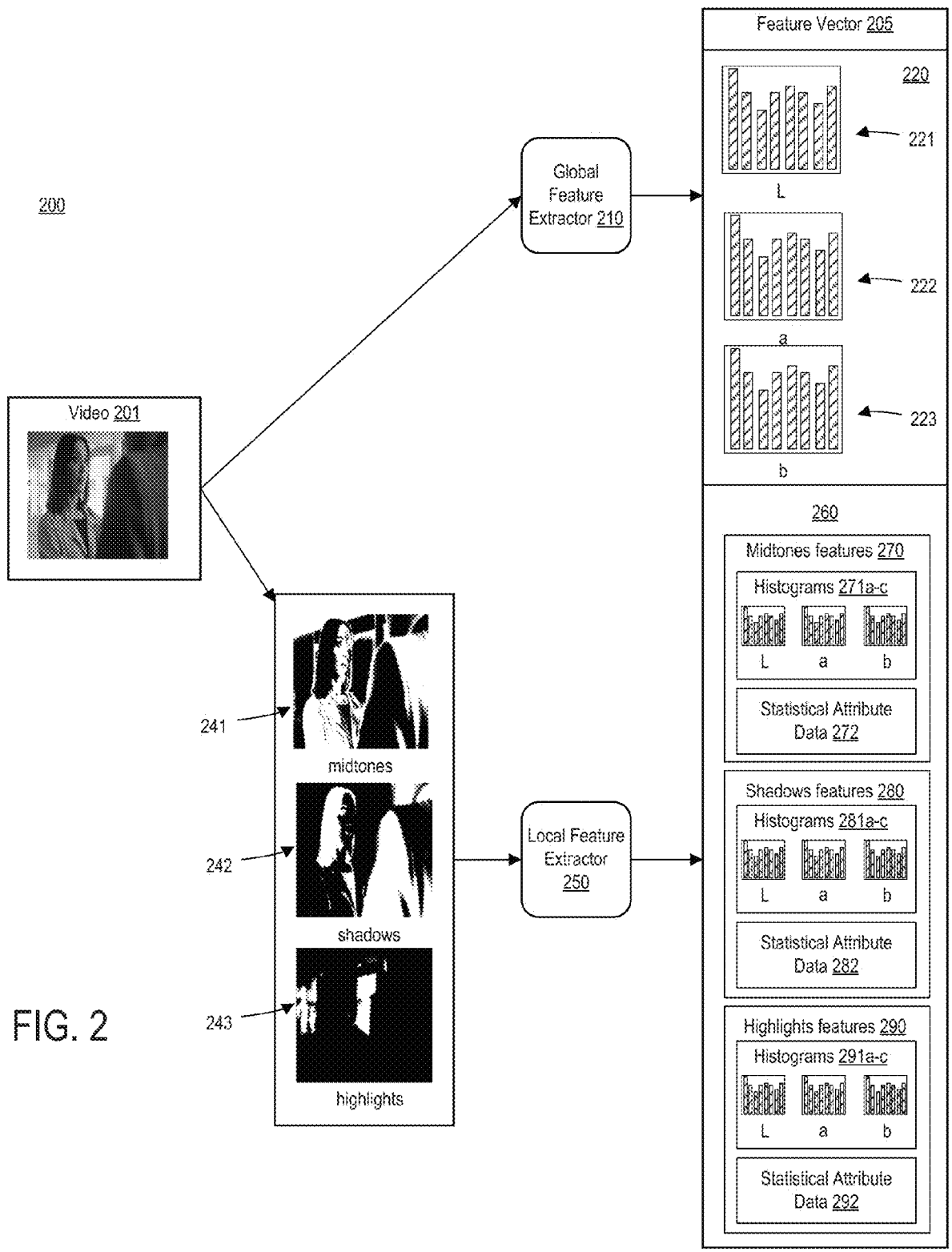
FIG. 2 depicts an example of feature vector used by a color consistency system, according to certain embodiments of the present disclosure.

FIG. 2 depicts an example of a feature vector used by a color consistency system, according to certain embodiments of the present disclosure. FIG. 2 depicts feature vector generation environment 200. Feature vector generation environment 200 includes video 201, global feature extractor 210, local feature extractor 250, tonal segments 241-243, and feature vector 205.

Color consistency application 102 creates two or more feature vectors 205 that represent the reference and target videos in such a manner that the color characteristics of the respective videos are captured. For example, a reference feature vector is created for the reference video 103 and a target feature vector is created for the target video 104. The reference feature vector and the target feature vector are created in the same manner, as described below. The reference feature vector and the target feature vector and are integrated into a concatenated feature vector 110 as described in FIG. 1. Feature vector 111 is generated in a similar manner, by combining the feature vector components from intermediate video 105 and reference video 103.

Feature vector 205 includes component 220, representing global features, and component 260, representing local features. More specifically, component 220 represents global features such as lightness in histogram 221 and color in histograms 222-223. Component 260 represents histograms and statistical attribute data derived from different tonal segments such 241-243. Tonal segments 241-243 each represent a set of pixels that fall into a specific predefined range of lightness values. Tonal segments 241-243 can be as shadows, midtones and highlights, but other ranges are possible.

Global feature extractor 210 and local feature extractor 250 can operate on videos in the L-a-b color space. The L-a-b color spaces include three channels: lightness, a, and b. The a and b channels relate to color. If appropriate, color consistency application 102 converts the target and reference video videos from an R-G-B color space to an L-a-b color space. Advantages to operating in the L-a-b color space include avoiding the need to modify three different channels for certain types of video adjustment, e.g., brightness.

In an example, global feature extractor 210 receives video 201, converts the video to L-a-b color space, and creates component 220. Component 220 includes histogram 221 for the L channel and histograms 222 and 223 for the a and b color channels respectively. In this manner, a global lightness of the image is represented by histogram 221 and an overall color distribution is represented by histograms 222-223.

Each histogram 221-223 is a frequency distribution of each pixel value within the video across all the possible pixel values. These histogram provides the predictive model 120 information to compare the overall exposure and color distribution of the reference video with the target video. For example, if the reference video 103 is bright, then the predictive model 120 can propagate a correct level of brightness adjustment to target video 104. Similarly, if reference video 103 has a particular tint, then predictive model 121 can propagate a correct level of tint adjustment to target video 104.

Continuing the example, local feature extractor 250 receives video 201, extracts the a and b color channels, and generates one or more tonal segments. Tonal segments correspond to certain areas of an video that have a specific tone, for example, a face, or an object. More specifically, tonal segments are the pixels corresponding to ranges of pixels in the lightness channel. For example, as shown, three tonal ranges, midtones, shadows, and highlights are generated as depicted by tonal segments 241-243 respectively. Each segment includes the values from the L, a, and b color channels that correspond to pixel values that have a channel value of a certain range. Tonal segments 241-243 can each be represented by a mask, where the mask represents which pixels are included in the particular tonal segment.

Local feature extractor 250 can represent the different tonal segments by creating masks. Pixel values in a mask that are lower than the range are set to zero and pixel values that are higher than the range are set to one. Pixel values with the range are smoothed between zero and one by using smooth-step function.

For each tonal segment 241-243, local feature extractor 250 generates features such as statistical attribute data and histograms. Statistical attribute data includes statistics such as a mean or a standard deviation of one or more color channels of a tonal segment. Statistical attribute data can also include a median, variance, or other statistics derived from the tonal segments 241-243. Statistical attribute data can also include a histogram for a lightness or color channel of a tonal segment 241-243. Each histogram is a frequency distribution of each pixel value within the video across all the possible pixel values.

The statistics for each tonal segment are integrated into the feature vector. For example, features 270 includes histograms 271*a-c* for the L, a, and b channels of tonal segment 241, and statistical attribute data 272, which includes a mean or standard deviation. Features 280 includes histograms 281*a-c* for the L, a, and b channels of tonal segment 242, and statistical attribute data 282, which includes a mean or standard deviation. Features 290 includes histograms 291*a-c* for the L, a, and b channels of tonal segment 243, and statistical attribute data 292, which includes a mean or standard deviation.

In an embodiment, color consistency application 102 searches for face regions within the reference video 103 and the target video 104. If faces are present, then color consistency application 102 creates a mask for a facial region in reference video 103 and target video 104. In this case, color consistency application operates on the masked videos substantially similarly to as previously described. In doing so, color consistency application 102 gives more preference to skin tones and can better match skin tone in the reference video 103 and target video 104.

Color consistency application 102 creates a feature vector 205 for reference video 103 and a feature vector 205 for target video 104. Color consistency application 102 combines the feature vectors into a concatenated feature vector 110 includes global and local features for each video.

Figure 3:
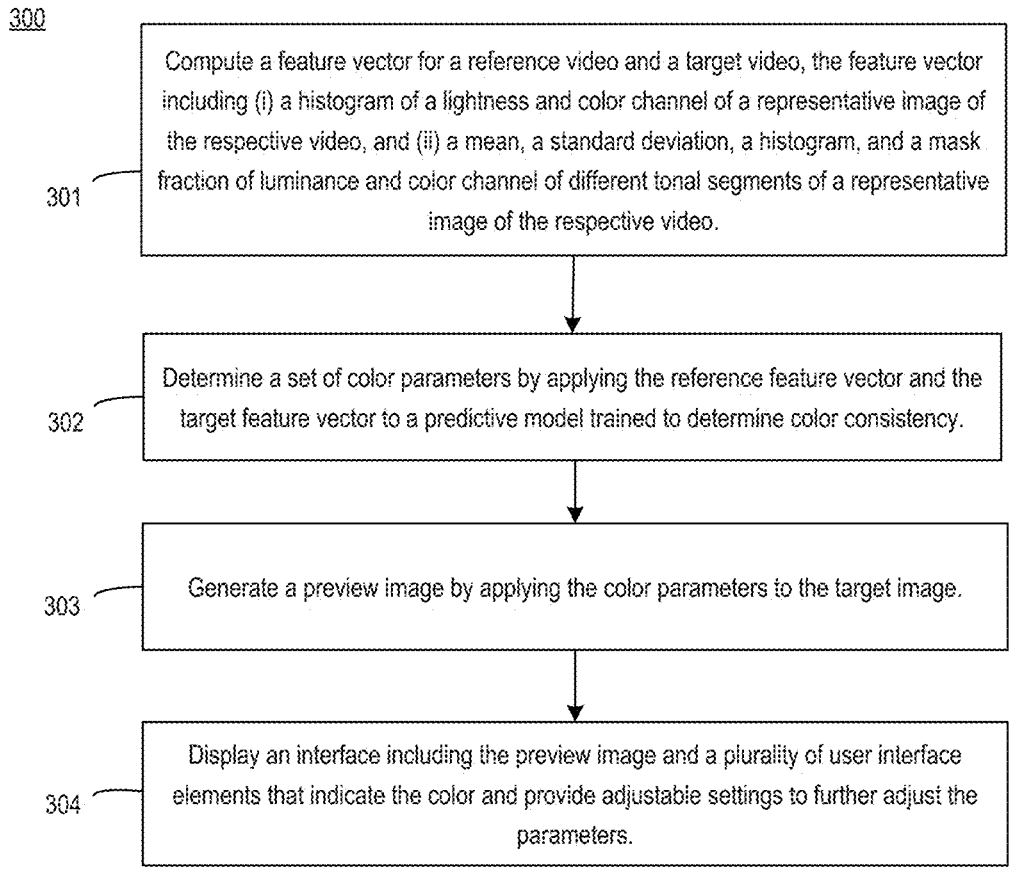
FIG. 3 is a flowchart that an exemplary process for propagating color consistency between video segments, according to certain embodiments of the present disclosure.

FIG. 3 is a flowchart depicting an example of a process 300 for propagating color consistency between video segments, according to certain embodiments of the present disclosure. Process 300 is described with respect to the environment described in FIG. 1 and the feature vector described in FIG. 2, but can be used with other feature vectors.

At block 301, process 300 involves computing a reference feature vector for a reference video and a target feature vector for a target video. Reference video 103 and target video 104 can each be represented in the L-a-b color space and include a lightness channel and color channels a or b. Color consistency application 102 computes feature vector 110 that includes global and local features extracted from reference video 103 and target video 104.

Feature vector 110 includes global and local features for both the reference and target videos. For example, feature vector 110 includes a lightness histogram 221 and one or more color histograms 222-223, and features 270, 280, and 290, derived from tonal segments 241, 242, and 243 respectively.

At block 302, process 300 involves determining a set of color parameters by applying the reference feature vector and the target feature vector to one or more predictive models trained to determine color consistency. Color parameters can include exposure, color temperature, or tint.

Color consistency application 102 provides feature vector 110 to predictive model 120. Based on training and the feature vectors, the predictive model 120 determines a set of exposure parameters 135 that corresponds to changes in exposure to be applied to the target video. Color consistency application 102 applies the exposure parameters to intermediate video 105, and derives feature vector 111 based on intermediate video 105 and reference video 103. Color consistency application 102 then provides feature vector 111 to predictive model 121. Predictive model 121 outputs color temperature and tint parameters 136 that correspond to changes to color temperature and tint to be applied to the target video.

At block 303, process 300 involves generating a preview video by applying the color parameters to the target video. The application of color parameters can cause an adjustment of exposure, color temperature, or tint in the target video such that a color characteristics of the adjusted target video is consistent with a color characteristics of the reference video. The combined parameters 140, if applied to the target video 104, cause the target video 104 to have a color cast, or consistency that corresponds to that of reference video 103.

For example, the color consistency application 102 can cause a preview of the target video with the parameters applied. In this manner, color consistency application 102 can receive inputs from a user device that specify as further refinements to the parameters.

At block 304, process 300 involves displaying an interface comprising the preview image and a plurality of user interface elements that indicate the color parameters and provide adjustable settings to further adjust the parameters. Color consistency application 102 can receive further input from a user, such as via user interface controls such as sliders, to refine or otherwise adjust the predicted values. In some embodiments, the color consistency application 102 uses parameter values computed by the process 300 and adjusted by subsequent user inputs to modify the color characteristics of the target video.

Training the Predictive Model

Embodiments described herein use machine learning to train one or more predictive models 120. The objective of training data is that when provided to predictive model 120 or 121, the predictive model learns how the feature vectors 110 varies with different parameters such that predictive model 120 can accurately model color characteristics of a reference image and a target image, and create a set of parameters that if applied to the target image, will propagate the color consistency of the reference image to the target image. Training can be supervised, e.g., training in which a solution is provided with the data. In an example, a dataset is created that includes multiple training vectors.

Each training vector includes an original image, a modified image, and a set of parameters. The modified image is created, either manually or automatically, by modifying the original image with a set of parameters. The parameters include color parameters such as exposure, color temperature, and tint, which can be generated manually or automatically. For example, the parameters can be generated randomly such that over a sufficiently large set of training data, the predictive model is exposed to parameters that are across a range of valid parameters.

Training data can be generated in a randomized manner. For example, a training application obtains an image. The training application generates random changes to the exposure, temperature, and tint of the image in order to create the modified image. The training application stores the original image, modified image, and the parameters in a training vector. Additionally, training data can be used that is generated from situations in which a use uses a reference video, target video, and manually adjusted exposure, temperature and tint match target video with reference video.

The set of training vectors can be divided into a training group and a test group such that the vectors in the test group are not used to train the predictive model. The number of training vectors and the number test vectors depends on how much data is needed to train and test the predictive model. Feature vectors are generated that represent the images. The training group of images is provided to the machine learning model. The test group of images is used for subsequent testing of the trained model.

Training can be an iterative process. For example, a first training vector is obtained from the training data set. An application creates a first feature vector that represents the original image and a second feature vector that represents the modified image using the techniques described with respect to FIGS. 2 and 3. The application provides the feature vectors to the model. The machine learning model predicts, from the images, a set of parameters that if applied would transform the original shot to be consistent in color with the original shot. The application compares the actual parameters from the training vector to the predicted parameters. A loss function is generated that measures the difference between the generated set of parameters and the actual set of parameters. With each iteration, the model seeks to minimize the loss function.

At a point at which adequate training has been performed, the application can test the predictive model. The application provides the test images to the predictive model. Because the predictive model has not seen the test images, the testing helps ensure that the model can process new data sets.

Figure 4:
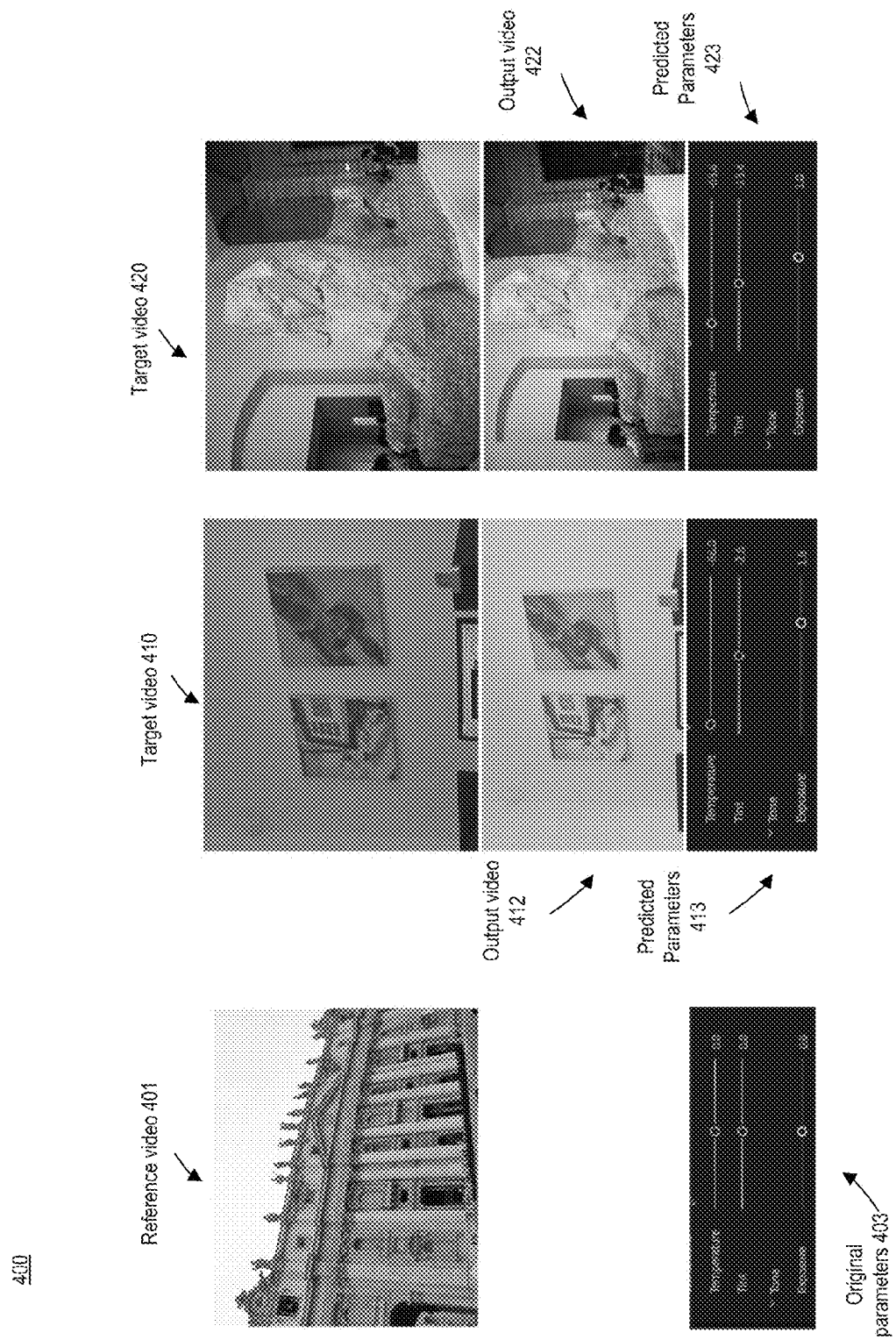
FIG. 4 depicts exemplary inputs and outputs of a color consistency application, according to certain embodiments of the present disclosure.

FIG. 4 depicts examples of inputs and outputs of a color consistency application 102, according to certain embodiments of the present disclosure. FIG. 4 depicts various examples of videos and parameters 400. Exemplary videos and parameters 400 includes a reference video 401, original parameters 403, target video 410, output video 412, predicted parameters 413, target video 420, output video 422, and predicted parameters 423.

Reference video 401 is a video from a movie. Color consistency application 102 receives a selection of reference video 401. Original parameters 403 include individual parameters for temperature, tint, exposure, and the like. The original parameters 403 are all set to zero, reflecting that reference video 401 is an original video.

Target videos 410 and 420 show different videos from two different movies. Color consistency application 102 receives an instruction that a set of parameters should be determined for each of target video 410 and target video 420, such that application of the respective parameters would result in output video 412 and output video 422 having the color consistency of reference video 401.

Color consistency application 102 generates reference a concatenated feature vector 110 from a reference feature vector generated from reference video 401 and target feature vector generated from target video 410. Color consistency application 102 provides feature vectors to predictive model 120. In turn, predictive model 120 outputs predicted parameters 413, which includes user interface sliders for temperature, tint, and exposure. Color consistency application 102 applies predicted parameters 413 to target video 410 and obtains output video 412, which can be displayed as a preview for a user.

Color consistency application 102 generates reference a concatenated feature vector 110 from a reference feature vector generated from reference video 401 and target feature vector generated from target video 420. Color consistency application 102 provides feature vectors to predictive model 120. In turn, predictive model 120 outputs predicted parameters 423, which includes user interface sliders for temperature, tint, and exposure. Color consistency application 102 applies predicted parameters 423 to target video 410 and obtains output video 422, which can be displayed as a preview for a user.

Example of a Computing System for Implementing Certain Embodiments

Figure 5:
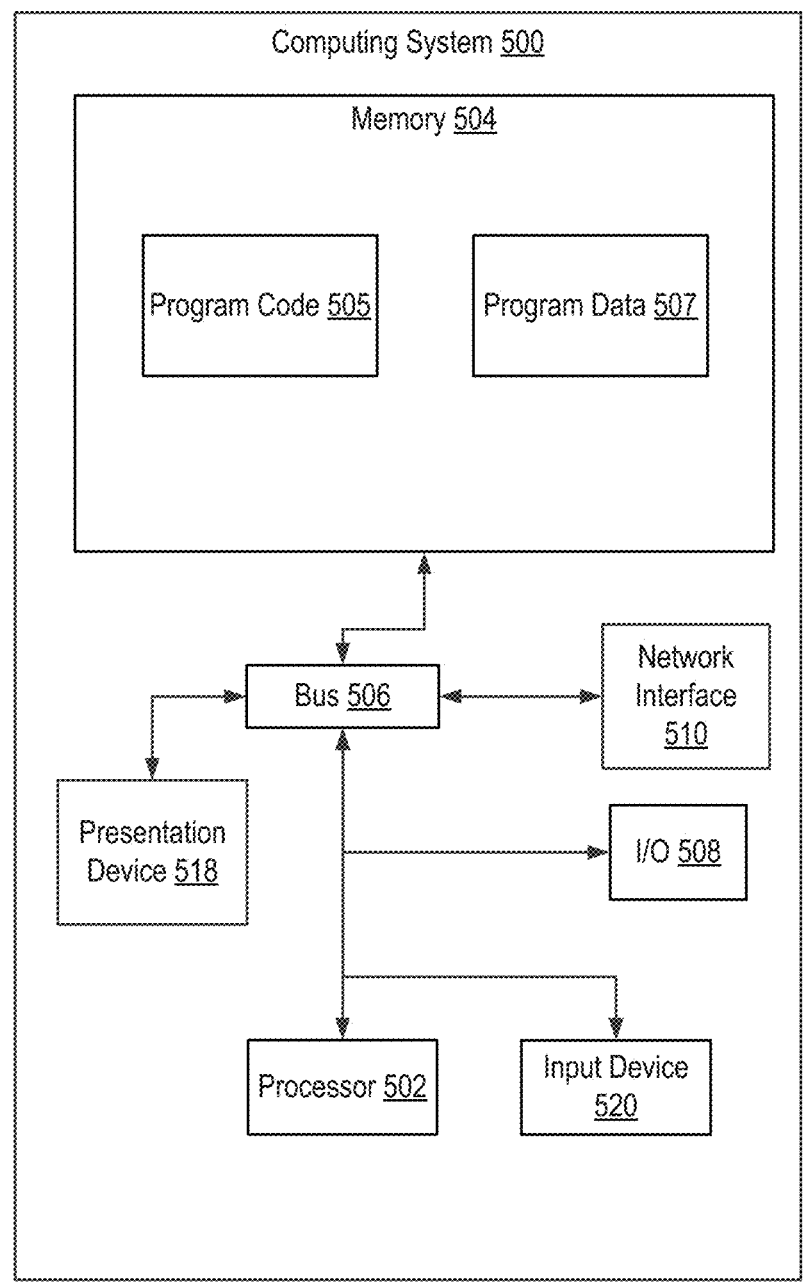
FIG. 5 depicts an example of a computing system for implementing certain embodiments of the present disclosure.

Any suitable computing system or group of computing systems can be used for performing the operations described herein. For example, FIG. 5 depicts an example of a computing system for implementing certain embodiments of the present disclosure. The implementation of computing system 500 could be used for one or more of color consistency application 102, global feature extractor 210, local feature extractor 250, or predictive model 120.

The depicted example of a computing system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

A memory device 504 includes any suitable non-transitory computer-readable medium for storing program code 505, program data 507, or both. Program code 505 and program data 507 can be from color consistency application 102, predictive model 120, or any other applications or data described herein. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 500 may also include a number of external or internal devices, an input device 520, a presentation device 518, or other input or output devices. For example, the color consistency environment 100 is shown with one or more input/output ("I/O") interfaces 508. An I/O interface 508 can receive input from input devices or provide output to output devices. One or more buses 506 are also included in the computing system 500. The bus 506 communicatively couples one or more components of a respective one of the computing system 500.

The computing system 500 executes program code 505 that configures the processor 502 to perform one or more of the operations described herein. Examples of the program code 505 include, in various embodiments, modeling algorithms executed by the color consistency application 102, or other suitable applications that perform one or more operations described herein. The program code may be resident in the memory device 504 or any suitable computer-readable medium and may be executed by the processor 502 or any other suitable processor.

In some embodiments, one or more memory devices 504 stores program data 507 that includes one or more datasets and models described herein. Examples of these datasets include interaction data, environment metrics, training interaction data or historical interaction data, transition importance data, etc. In some embodiments, one or more of data sets, models, and functions are stored in the same memory device (e.g., one of the memory devices 504). In additional or alternative embodiments, one or more of the programs, data sets, models, and functions described herein are stored in different memory devices 504 accessible via a data network.

In some embodiments, the computing system 500 also includes a network interface device 510. The network interface device 510 includes any device or group of devices suitable for establishing a wired or wireless data connection to one or more data networks. Non-limiting examples of the network interface device 510 include an Ethernet network adapter, a modem, and/or the like. The computing system 500 is able to communicate with one or more other computing devices via a data network using the network interface device 510.

In some embodiments, the computing system 500 also includes the input device 520 and the presentation device 518 depicted in FIG. 5. An input device 520 can include any device or group of devices suitable for receiving visual, auditory, or other suitable input that controls or affects the operations of the processor 502. Non-limiting examples of the input device 520 include a touchscreen, a mouse, a keyboard, a microphone, a separate mobile computing device, etc. A presentation device 518 can include any device or group of devices suitable for providing visual, auditory, or other suitable sensory output. Non-limiting examples of the presentation device 518 include a touchscreen, a monitor, a speaker, a separate mobile computing device, etc. Presentation device 518 is configurable to display a preview of output video 150, reference video 103, or target video 104. In addition, presentation device 518 can display user interface elements, such as sliders or controls, that allow configuration of combined parameters 140.

Although FIG. 5 depicts the input device 520 and the presentation device 518 as being local to the computing device that executes the color consistency application 102, other implementations are possible. For instance, in some embodiments, one or more of the input device 520 and the presentation device 518 can include a remote client-computing device that communicates with the computing system 500 via the network interface device 510 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method for propagating color consistency between video segments, the method comprising:
   computing a feature vector comprising a representation of a reference video and a target video, wherein each video comprises a lightness channel and a color channel, the feature vector including:
   (i) a first histogram of a lightness channel and a second histogram of a color channel of a representative image of the respective video, and
   (ii) statistical attribute data and a mask for each of the lightness channel and the color channel of a tonal segment of the representative image of the respective video, wherein the tonal segment corresponds to pixels in the lightness channel that are within a tonal range;
   determining a set of color parameters by providing the feature vector to a machine learning model, wherein the machine learning model is trained to determine color consistency;
   generating a preview image based on the target video by applying the set of color parameters to the target video, wherein the applying causes an adjustment of color in the target video such that a preview color consistency of the preview image is consistent with a reference color consistency of the reference video; and
   displaying an interface comprising the preview image and user interface elements, the user interface elements (i) indicating the set of color parameters, respectively, and (ii) providing adjustable settings to respectively adjust the set of color parameters.

2. The method of claim 1, wherein the statistical attribute data comprises a mean, a standard deviation, and a histogram of the tonal segment, and
   wherein the tonal segment is derived from shadows, midtones, or highlights of the respective image.

3. The method of claim 1, wherein determining the set of color parameters further comprises:
   determining a first color parameter by applying the machine learning model to the feature vector;
   creating an intermediate video by providing the first color parameter to the target video;
   generating an additional feature vector from the intermediate video and the reference video;
   determining a second color parameter by providing the additional feature vector to an additional machine learning model; and
   combining the first color parameter and the second color parameter into the set of color parameters.

4. The method of claim 3, further comprising iteratively training at least one model from the machine learning model and the additional machine learning model, the training comprising:
   applying the model to a training vector comprising a feature vector of a training reference video, a feature vector of a training target video, and a set of expected parameters, wherein the set of expected parameters propagate a training reference color consistency to the training target video;
   receiving, from the model, a set of predicted parameters;
   calculating a loss function by calculating a difference between the set of expected parameters and the set of predicted parameters; and minimizing the loss function by modifying internal parameters of the model.

5. The method of claim 1, further comprising:
displaying a preview image by applying the set of color parameters to a frame of the target video;
receiving an adjustment to one of user interface elements;
creating additional parameters representing the adjustment; and
adjusting the preview image by applying the additional parameters to the frame of the target video.

6. The method of claim 5, further comprising, responsive to receiving further user input, creating an output video by applying the additional parameters to the target video such that an output color consistency of the output video matches the reference color consistency.

7. The method of claim 1, wherein the machine learning model is a gradient boosted decision tree.

8. A system comprising:
a processing device; and
a memory device communicatively coupled to the processing device, wherein the processing device is configured to execute instructions included in the memory device to perform operations comprising:
  computing a feature vector comprising a representation of a reference video and a target video, wherein each video comprises a lightness channel and a color channel, the feature vector including:
    (i) a first histogram of a lightness channel and a second histogram of a color channel of a representative image of the respective video, and
    (ii) statistical attribute data and a mask for each of the lightness channel and the color channel of a tonal segment of the representative image of the respective video, wherein the tonal segment corresponds to pixels in the lightness channel that are within a tonal range;
  determining a set of color parameters by providing the feature vector to a machine learning model, wherein the machine learning model is trained to determine color consistency;
  generating a preview image by applying the set of color parameters to the target video, wherein the applying causes an adjustment of color in the target video such that a preview color consistency of the preview image is consistent with a reference color consistency of the reference video; and
  displaying an interface comprising the preview image and user interface elements that indicate the set of color parameters and provide adjustable settings to further adjust the set of color parameters.

9. The system of claim 8, wherein the statistical attribute data comprises a mean, a standard deviation and a histogram of the tonal segment, and wherein the tonal segment is derived from at least one of shadows, midtones, or highlights of the respective image.

10. The system of claim 8, wherein determining the set of color parameters comprises:
determining a first color parameter by providing the feature vector to the machine learning model;
creating an intermediate video by providing the first color parameter to the target video;
generating an additional feature vector from the intermediate video and the reference video;
determining a second color parameter by providing the additional feature vector to an additional machine learning model; and
combining the first color parameter and the second color parameter into the set of color parameters.

11. The system claim 10, the operations further comprising iteratively training at least one machine learning model from the machine learning model and the additional machine learning model, the training comprising:
providing, to the at least one machine learning model, a training vector comprising a feature vector of a training reference video, a feature vector of a training target video, and a set of expected parameters, wherein the set of expected parameters propagate a training reference color consistency to the target video;
receiving, from the at least one machine learning model, a set of predicted parameters;
calculating a loss function by calculating a difference between the set of expected parameters and the set of predicted parameters; and
minimizing the loss function by adjusting internal parameters of at least one model.

12. The system of claim 8, the operations further comprising:
displaying a preview image by applying the set of color parameters to a frame of the target video;
receiving an adjustment to one of user interface elements;
creating an additional set of parameters representing the adjustment; and
adjusting the preview image by applying the additional set of parameters to the frame of the target video.

13. The system of claim 12, the operations further comprising creating, responsive to receiving further user input, an output video by applying the additional set of parameters to the target video such that an output color consistency of the output video matches the reference color consistency.

14. A non-transitory computer-readable medium having program code that is stored thereon, wherein the program code is executable by one or more processing devices for performing operations comprising:
computing a first feature vector comprising a representation of a reference video and a target video, wherein each video comprises a lightness channel and a color channel, the first feature vector including:
  (i) a first histogram of a lightness channel and a second histogram of a color channel of a representative image of the respective video, and
  (ii) statistical attribute data and a mask for each of the lightness channel and the color channel of a tonal segment of the representative image of the respective video, wherein the tonal segment corresponds to pixels in the lightness channel that are within a tonal range;
determining a first color parameter by providing the first feature vector to a first predictive model;
creating an intermediate video by providing the first color parameter to the target video;
generating a second feature vector from the intermediate video and the reference video;
determining a second color parameter by providing the second feature vector to a second predictive model; and
generating a preview image by applying the first color parameter and the second color parameter to a frame of the target video, wherein the applying causes an adjustment of an exposure in the frame, a color temperature in the frame, or a tint in the frame such that a preview color consistency of the preview image is consistent with a reference color consistency of the reference video.

15. The non-transitory computer-readable medium of claim 14, wherein the statistical attribute data comprises a mean, a standard deviation and a histogram of the tonal segment, and wherein the tonal segment is derived from at least one of shadows, midtones, or highlights of the respective image.

16. The non-transitory computer-readable medium of claim 14, wherein the first color parameter is the exposure and the second color parameter is at least one of (i) the color temperature or (ii) the tint.

17. The non-transitory computer-readable medium of claim 14, the operations further comprising iteratively training at least one machine learning model from the first predictive model and the second predictive model, the training comprising:
   providing, to the at least one machine learning model, a training vector comprising a feature vector of a training reference video, a feature vector of a training target video, and a set of expected parameters, wherein the set of expected parameters that if applied to the training target video, propagate a training reference color consistency to the target video;
   receiving, from the at least one machine learning model, a set of predicted parameters;
   calculating a loss function by calculating a difference between the set of expected parameters and the set of predicted parameters; and
   minimizing the loss function by adjusting internal parameters of the at least one machine learning model.

18. The non-transitory computer-readable medium of claim 14, the operations further comprising:
   displaying an interface comprising the preview image and user interface elements, the user interface elements (i) respectively indicating the first color parameter and the second color parameter and (ii) providing adjustable settings to respectively adjust the first color parameter and the second color parameter;
   receiving an adjustment to one of the user interface elements;
   creating an additional set of parameters representing the adjustment; and
   adjusting the preview image by applying the additional set of parameters to the frame of the target video.

19. The non-transitory computer-readable medium of claim 18, the operations further comprising, responsive to receiving further user input, creating an output video by applying the first color parameter and the second color parameter to the target video such that an output color consistency of the output video matches the reference color consistency.

20. The non-transitory computer-readable medium of claim 14, wherein at least one of the first predictive model or the second predictive model is a gradient boosted decision tree.

* * * * *